United States Patent [19]
Barone et al.

[11] 3,725,438
[45] Apr. 3, 1973

[54] PRODUCTION OF CYCLIC ACETALS

[75] Inventors: Bruno J. Barone, Houston, Tex.; William F. Brill, Skillman, N.J.

[73] Assignee: Petro-Tex Chemical Corporation, Houston, Tex.

[22] Filed: Oct. 16, 1970

[21] Appl. No.: 81,554

[52] U.S. Cl. ............................................260/340.9
[51] Int. Cl. .............................................C07d 13/04
[58] Field of Search....................................260/340.9

[56] References Cited

UNITED STATES PATENTS 3,475,457  10/1969  Sianesi et al.........................260/340.9
3,475,461  10/1969  Lloyd ..............................260/347.8

*Primary Examiner*—Alex Mazel
*Assistant Examiner*—James H. Turnipseed
*Attorney*—G. Baxter Dunaway

[57] ABSTRACT

Formation of cyclic acetal compounds of the formula

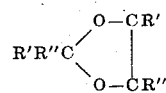

by reacting a carbonyl compound of the formula $R'R''C = O$ with a second reactant which is

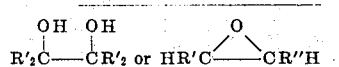

wherein R' and R'' are selected from the group consisting of hydrogen and an acyclic aliphatic hydrocarbon radical in the presence of a catalyst selected from the group consisting of compounds of Periodic Table Groups VB and VIB. For example acetaldehyde is reacted in liquid phase with ethylene oxide in the presence of molybdenum acetyl acetonate to form 2-methyl-1, 3-dioxolane.

10 Claims, No Drawings

PRODUCTION OF CYCLIC ACETALS

This invention relates to a method for the formation of compounds of the formula

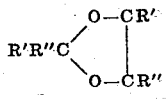

which comprises reacting a carbonyl compound of the formula R'R"C = O with a second reactant which is a member selected from the group consisting of

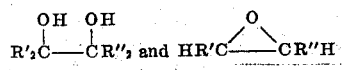

and mixtures thereof wherein R' and R" are selected from the group consisting of hydrogen and an acyclic aliphatic hydrocarbon radical having from one to 4 carbon atoms and in the presence of a catalyst selected from the group consisting of compounds of Periodic Table Groups VB and VIB.

The compounds of the formula

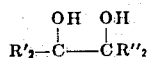

referred to hereafter as glycols, used as reactants may be such as propylene glycol or other glycols within the definition. The compounds of the formula

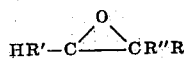

referred to hereafter as epoxides, may be such as isobutylene oxide, ethylene oxide, propylene oxide or other epoxides within the definition. The compounds of the formula R'R"C = O, referred to hereafter as the carbonyl compounds, may be such as acrolein, methyl ethyl ketone or other carbonyl compounds within the definition. In these definitions R' or R" may be saturated or unsaturated or may be a combination of saturated and unsaturated radicals.

Typical reactions are the reaction of acetaldehyde with ethylene oxide or ethylene glycol to form 2-methyl-1, 3 dioxolane, acetaldehyde with isobutylene oxide or isobutylene glycol to form 2-methyl-4, 4 dimethyl-1,3 dioxolane. The epoxide or glycol reactant may be formed in situ from the corresponding olefin by adding oxygen to the reaction. For instance instead of starting with propylene oxide the reactant may be propylene and the propylene oxide is formed in situ by oxidation with oxygen and if water or other source of hydroxyl ions is present the corresponding glycol will be formed as the reactant. Starting olefins may be such as propylene, n-butene-1, n-butene-2, ixobutene, methyl butene, hexene-1 and so forth.

The ratio of amounts of epoxide, glycol (or equivalent olefin precursor) and carbonyl compound may be varied over a wide range, as from about 1/10 mol epoxide or glycol to one mol of carbonyl compound to 1/10 mol of carbonyl compound to one mol of epoxide or glycol but approximately stoichiometric quantities to give the desired cyclic acetal are preferred.

The reactions are conducted in liquid phase preferably at temperatures in the range of about 25°C to about 125°C. A more preferred range of temperatures of reaction is from about 50°C to about 70°C. The reactions may be conducted at atmospheric pressure, at subatmospheric or super-atmospheric pressure. It is not believed that the pressure at which the reaction is conducted is critical. Free oxygen may be fed to the reaction zone or the reaction may be conducted in an oxygen atmosphere e.g. up to 500 p.s.i.g. or higher. The reaction may be conducted under an inert gas, as nitrogen, under high vacuum, or in a system where the reactants are continuously refluxed. While solvents may be used, they are not necessary and excess reactants may be used as the solvent. However, in some instances organic solvents such as benzene or toluene may be used particularly when it is desired to azeotropically distill off water formed in the reaction. Water may be employed as an added solvent.

The catalyst is a critical part of the invention and should be a compound of Periodic Table Groups VB and VIB; that is, vanadium, niobium, tantalum, chromium, molybdenum, tungsten or mixtures thereof with molybdenum, chromium, tungsten and vanadium being preferred with molybdenum being the most preferred species. The catalyst should be present as a compound which is soluble in the reaction medium such as hydrocarbon soluble compounds. Suitable catalysts are such as the complexes or chelate compounds including the acetyl acetonates, soluble salts such as naphthenates or octoates. Other soluble compounds such as carbonyl compounds may be suitably used. Examples of catalysts are molybdenum acetyl acetonate or naphthenate.

It has been discovered that certain other metal catalysts are ineffective such as compounds of nickel, zinc, aluminum, lead, magnesium, copper, cobalt and manganese.

The cyclic acetals of the invention are useful as solvents and are particularly valuable because of their stability toward alkalis. Also the cross linked products are useful as plasticizers.

The following Examples are only illustrative. All percents are by weight unless expressed otherwise.

EXAMPLE 1

The following example illustrates the reaction of an unsaturated aldehyde, propylene:

A 500 ml. stainless steel autoclave was charged with 2.5 moles of acrolein, 2.6 moles of propylene and 0.5 g. of molybdenyl acetylacetonate. It was heated to 60° with stirring under 300 psi. of oxygen for 30 minutes. By analysis of the products by gas chromatography, it was found that 0.043 mole of olefin had reacted to give 2-vinyl-4-methyl dioxolane in a 98 percent selectivity.

EXAMPLE 2.

A solution of 0.05 mole each of acetaldehyde and propylene oxide containing 0.05 g. of molybdenyl acetylacetonate and 0.008 mole of water was allowed to react for 24 hours at 60°C. Gas chromatographic analysis showed that 80 percent of the aldehyde and 90 percent of the epoxide had reacted to give a theoretical yield of cyclic acetal of 75 percent.

EXAMPLE 3 – 17

Examples 3 to 7 illustrate the invention. Examples 8 to 17 illustrate the failure of other metal compounds to catalyze the reaction.

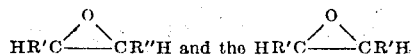

compound is formed in situ by the reaction of an olefin of the formula HR'C=CR"H with oxygen to form the said

TABLE

| Example | Reactants | Catalyst | Time and temp. | Pressure | Cyclic acetal product |
|---|---|---|---|---|---|
| 3 | 2.5 M acrolein, 2.5 M propylene | 1.5 g. Mo naphthenate | 2.0 hours, 50° C. | 300 p.s.i. O₂. | 2-vinyl-4 methyl dioxolane. |
| 4 | .05 M propylene oxide, .05 M acetaldehyde. | 0.05 g. Mo naphthenate | 24 hours, 60° C. | Sealed tube. | {25%trans-2,4, dimethyl-1,3 dioxolane.¹ {10.7% cis-2,4 dimethyl-1,3 dioxolane.¹ |
| 5 | .05 M propylene oxide, .05 M acetaldehyde, .008 M water. | .05 g. Mo. acetyl acetonate | do | do | {Trans-2,4 dimethyl-1,3 dioxolane. {Cis 2,4 dimethyl-1,3-dioxolane. |
| 6 | .1 M propylene blycol, .1 M acrolein | .05 g. acetyl acetonate | do | do | 62% 2 vinyl-4-methyl dioxolane.² |
| 7 | .5 M propylene oxide, .5 M acrolein, .05 M water. | .1 wt. percent zirconium acetyl acetonate. | do | do | 2-vinyl-4-methyl dioxolane. |
| 8 | do | .1 wt percent nickel acetyl acetonate. | do | do | None detected. |
| 9 | do | .1 wt. percent zinc acetyl acetonate. | do | do | Do. |
| 10 | do | .1 wt. percent aluminum acetyl acetonate. | do | do | Do. |
| 11 | do | .1 wt. percent plumbous acetyl acetonate. | do | do | Do. |
| 12 | .05 M propylene oxide, .05 M acrolein, .05 M water. | .1 wt percent magnesium acetyl acetonate. | do | do | Do. |
| 13 | do | .1 wt .percent cupric acetyl acetonate. | do | do | Do. |
| 12 | do | .1 wt. percent cobaltic acetyl acetonate. | do | do | Do. |
| 15 | do | .1 wt. percent manganous acetyl acetonate. | do | do | Do. |
| 16 | do | .1 wt. percent cobaltic acetyl acetonate. | do | do | Do. |
| 17 | do | .1 wt. percent manganic acetyl acetonate. | do | do | Do. |

¹ Selectivity based on epoxide consumed.
² Selectivity based on glycol consumed.

We claim:
1. A method for the formation of compounds of the formula

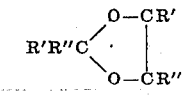

which comprises reacting a carbonyl compound of the formula R'R"C=O with a second reactant which is a member selected from the group consisting of

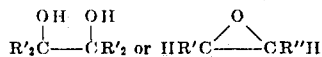

and mixtures thereof wherein R' and R" are selected from the group consisting of hydrogen and an acyclic aliphatic hydrocarbon radical having from one to 4 carbon atoms in the presence of a catalyst selected from the group consisting of compounds of molybdenum and zirconium which are soluble in the reaction medium.

2. The method of claim 1 wherein the said R'R"C=O compound is acetaldehyde.

3. The method of claim 1 wherein the said R'R"C=O compound is acrolein.

4. The method of claim 1 wherein the said

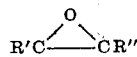

compound is propylene oxide.

5. The method of claim 1 wherein the said second reactant is

HR'—C—CR"R compound.

6. The method of claim 1 wherein the said catalyst is a compound of molybdenum.

7. The method of claim 1 wherein the said catalyst is molybdenum acetyl acetonate.

8. The method of claim 1 wherein the said catalyst is a naphthenate.

9. A method for the formation of compounds of the formula

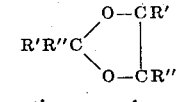

which comprises reacting a carbonyl compound of the formula R'R"C=O with a second reactant which is a member selected from the group consisting of

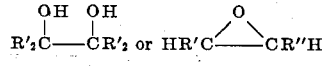

and mixtures thereof wherein R' and R" are selected from the group consisting of hydrogen and an acyclic aliphatic hydrocarbon radical having from one to 4 carbon atoms in the presence of a molybdenum naphthenate catalyst.

10. The method of claim 9 wherein the said R'R"C=O compound is acetaldehyde and the

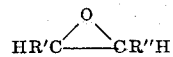

compound is propylene oxide.

* * * * *